United States Patent
Singh et al.

(10) Patent No.: US 10,248,490 B2
(45) Date of Patent: Apr. 2, 2019

(54) SYSTEMS AND METHODS FOR PREDICTIVE RELIABILITY MINING

(71) Applicant: Tata Consultancy Services Limited, Mumbai (IN)

(72) Inventors: Karamjit Singh, Gurgaon (IN); Gautam Shroff, Gurgaon (IN); Puneet Agarwal, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 227 days.

(21) Appl. No.: 15/057,882

(22) Filed: Mar. 1, 2016

(65) Prior Publication Data

US 2017/0109222 A1    Apr. 20, 2017

(30) Foreign Application Priority Data

Oct. 15, 2015 (IN) .......................... 3922/MUM/2015

(51) Int. Cl.
| | |
|---|---|
| *G06F 11/00* | (2006.01) |
| *G06F 11/07* | (2006.01) |
| *G05B 23/02* | (2006.01) |
| *G07C 5/00* | (2006.01) |

(52) U.S. Cl.
CPC ........ *G06F 11/079* (2013.01); *G05B 23/0275* (2013.01); *G06F 11/0709* (2013.01); *G06F 11/0751* (2013.01); *G06F 11/0772* (2013.01); *G07C 5/008* (2013.01)

(58) Field of Classification Search
CPC ............... G06F 11/079; G06F 11/0709; G06F 11/0772; G06F 11/0751; G07C 5/008; G05B 23/0275
USPC .............................................. 14/37
See application file for complete search history.

(56) References Cited

U.S. PATENT DOCUMENTS

| | | | |
|---|---|---|---|
| 6,604,032 B1 * | 8/2003 | Moller ................... | F02D 41/22 701/114 |
| 7,260,501 B2 | 8/2007 | Pattipatti et al. | |
| 8,433,472 B2 | 4/2013 | Singh et al. | |
| 8,498,776 B2 | 7/2013 | Singh et al. | |
| 8,676,432 B2 | 3/2014 | Patnaik et al. | |
| 2004/0117195 A1 * | 6/2004 | Bodin ................... | G06Q 10/20 705/39 |

(Continued)

*Primary Examiner* — Yair Leibovich
(74) *Attorney, Agent, or Firm* — Finnegan, Henderson, Farabow, Garrett & Dunner LLP

(57) ABSTRACT

Systems and methods for predictive reliability mining are provided that enable predicting of unexpected emerging failures in future without waiting for actual failures to start occurring in significant numbers. Sets of discriminative Diagnostic Trouble Codes (DTCs) from connected machines in a population are identified before failure of the associated parts. A temporal conditional dependence model based on the temporal dependence between the failure of the parts from past failure data and the identified sets of discriminative DTCs is generated. Future failures are predicted based on the generated temporal conditional dependence and root cause analysis of the predicted future failures is performed for predictive reliability mining. The probability of failure is computed based on both occurrence and non-occurrence of DTCs. The root cause analysis enables identifying a subset of the population when an early warning is generated and also when an early warning is not generated.

16 Claims, 9 Drawing Sheets

(56) References Cited

U.S. PATENT DOCUMENTS

| | | | |
|---|---|---|---|
| 2006/0089767 A1* | 4/2006 | Sowa | G01M 15/05 |
| | | | 701/31.4 |
| 2008/0059120 A1 | 3/2008 | Xiao et al. | |
| 2011/0118932 A1* | 5/2011 | Singh | G05B 19/0428 |
| | | | 701/31.4 |
| 2012/0232905 A1* | 9/2012 | Rajpathak | G06F 17/2785 |
| | | | 704/257 |
| 2013/0204485 A1* | 8/2013 | Chen | G06F 17/00 |
| | | | 701/29.6 |
| 2014/0277906 A1* | 9/2014 | Lowrey | G07C 5/008 |
| | | | 701/29.4 |
| 2015/0105972 A1* | 4/2015 | Madison | G07C 5/085 |
| | | | 701/33.2 |
| 2016/0019567 A1* | 1/2016 | Agarwal | G06Q 30/012 |
| | | | 705/7.31 |
| 2017/0179548 A1* | 6/2017 | Lee | H01H 69/02 |
| 2018/0237029 A1* | 8/2018 | Bansal | B60W 50/0205 |

* cited by examiner

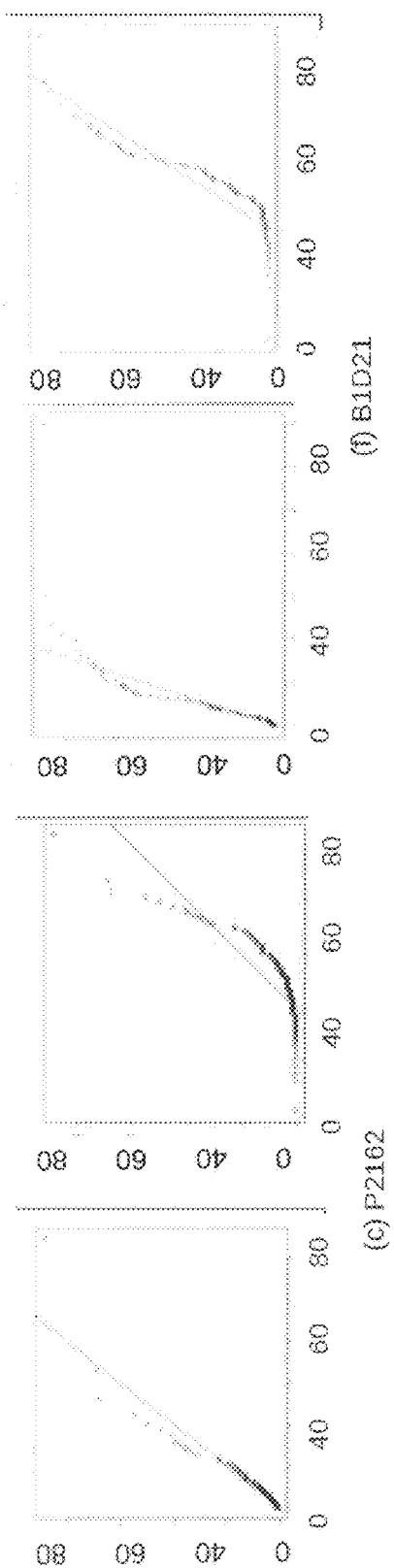
FIG. 4 (CONTD.)

SYSTEMS AND METHODS FOR PREDICTIVE RELIABILITY MINING

PRIORITY CLAIM

This U.S. patent application claims priority under 35 U.S.C. § 119 to: India Application No. 3922/MUM/2015 filed on 15 Oct. 2015. The entire contents of the aforementioned application are incorporated herein by reference.

TECHNICAL FIELD

The embodiments herein generally relate to predictive reliability mining, and more particularly to systems and methods involving sensor augmented reliability models.

BACKGROUND

With industrial internet shaping the future, it is only natural to have connected machines forming part of every aspect of technology. Traditionally, predictive reliability mining has been based on historical data on part failures from warranty claims using distributions from exponential family such as the Weibull or log-normal distribution. When observed failures (in one or more parts) across a population of machines exceeds the number expected based on such a model, this may serve as an early warning of a potential systemic problem with the population. Such early warnings rely on some exceptionally high failures having actually occurred. Again, it has been seen that significant deviations from expected failure counts may often occur only in some unknown subset of the population, for instance, a particular batch, or machines manufactured in a particular year or at a particular plant site, and the like. Such deviations are insignificant across the full population and remain unidentified when traditional reliability mining techniques are employed. It is a challenge to not only detect potential problems earlier than possible using traditional reliability analysis but also to identify a subset of the population wherein an anomaly may have occurred that would statistically be otherwise hidden in the population.

SUMMARY

Embodiments of the present disclosure present technological improvements as solutions to one or more of the above-mentioned technical problems recognized by the inventors in conventional systems.

Systems and methods of the present disclosure enable predictive reliability mining in a population of connected machines. Due to 'industrial internet', most industrial equipment, install sensors that continuously monitor run time behavior of desired components in the field and also transmit pre-defined sensor information back to the manufacturer by various means including over wireless cellular or metropolitan WiFi networks. In particular, modern automobiles have on-board electronic control modules that generate alphanumeric Diagnostic Trouble Codes (DTCs) to indicate abnormal sensor levels in various situations, some of which are indicative of actual or potential part malfunction. Such DTCs typically triggered before actual part failure. Systems and methods of the present disclosure analyze such DTCs to correlate the DTCs with future failure times to serve as early warning indicators of possible future part failures.

In an aspect, there is provided a computer implemented method for predictive reliability mining in a population of connected machines, the method comprising identifying sets of discriminative Diagnostic Trouble Codes (DTCs) from DTCs generated preceding failure, the sets of discriminative DTCs corresponding to associated pre-defined parts of the connected machines; generating a temporal conditional dependence model based on temporal dependence between failure of the pre-defined parts from past failure data and the identified sets of discriminative DTCs; and predicting future failures based on the generated temporal conditional dependence and occurrence and non-occurrence of DTCs.

In an embodiment, the step of predicting future failures can be followed by performing root cause analysis of the predicted future failures for predictive reliability mining.

In an embodiment, the step of identifying sets of discriminative DTCs is based on association rule mining, wherein the association rule mining comprises use of Apriori technique.

In an embodiment, antecedents of rules identified by the association rule mining technique form the set of discriminative DTCs.

In an embodiment, the temporal conditional dependence model is a Bayesian network.

In an embodiment, the temporal dependence between failure of the pre-defined parts from past failure data and the identified sets of discriminative DTCs follows a Weibull distribution.

In an embodiment, the step of generating a temporal conditional dependence model is followed by a step of segregating the population of connected machines into a first set comprising connected machines in which DTCs are not generated in a given time period and a second set comprising connected machines in which at least one DTC is generated in the given time period.

In an embodiment, the step of predicting future failures comprises the step of computing the probability of failure based on both occurrence and non-occurrence of DTCs in the segregated population of connected machines and generating an early warning when predicted number of failures are greater than expected number of failures based on the past failure data by a pre-defined value. In an embodiment, the pre-defined value is based on the predicted number of failures and variance of a random variable representing number of failures of the pre-defined parts in a given time period.

In an embodiment, the step of performing root cause analysis comprises identifying a subset of the population when an early warning for at least one of the pre-defined parts is generated. In an embodiment, the step of performing root cause analysis comprises (i) calculating a first expected time of failure based on the past failure data; (ii) segregating the population of connected machines into a first set comprising connected machines in which DTCs are not generated in a given time period and a second set comprising connected machines in which at least one DTC is generated in the given time period; (iii) calculating a second expected time of failure based on expected time of failure of the second set that is further based on pre-defined delay parameters and occurrence time of the at least one DTC; (iv) defining an anomaly score for each of the connected machines based on the calculated first expected time of failure and the second expected time of failure; (v) iteratively performing steps (i) through (iv) for pre-defined features of the connected machines; and (vi) identifying the subset of the population having the anomaly score greater than a pre-defined threshold, the identified subset indicating possible reasons for the early warning for each of the pre-defined features.

In an embodiment, the step of performing root cause analysis comprises identifying a subset of the population with a possible anomaly when an early warning is not generated at the population level. In an embodiment the step of performing root cause analysis comprises (i) defining an anomaly score for each of the connected machines; (ii) associating each of the connected machines with a record comprising a set of pre-defined features and the defined anomaly score; (iii) discretizing the defined anomaly score into either a pre-defined high level or a normal level; (iv) performing association rule mining to identify association rules with the high level anomaly score; (v) clustering the identified association rules using a density based technique to form rule clusters; (vi) selecting one or more rules from each of the rule clusters that have high support and confidence; and (vii) identifying the subset of the population with the high level anomaly score based on antecedents of the selected one or more rules that are indicative of potential reasons for the high level anomaly score.

In another aspect, there is provided a system for predictive reliability mining in a population of connected machines, the system comprising: one or more processors; a communication interface device; one or more internal data storage devices operatively coupled to the one or more processors for storing: an input module configured to receive Diagnostic Trouble Codes (DTCs) from on-board diagnostic systems of pre-defined parts of the connected machines; a DTC pattern identifier configured to identify sets of discriminative DTCs from DTCs generated preceding failure, the sets of discriminative DTCs corresponding to associated pre-defined parts of the connected machines; a Bayesian network generator configured to generate a temporal conditional dependence model based on temporal dependence between failure of the pre-defined parts from past failure data and the identified sets of discriminative DTCs; and a failure predictor configured to predict future failures based on the generated temporal conditional dependence and occurrence and non-occurrence of DTCs.

In an embodiment, the system described herein above can further comprise an analyzer configured to perform root cause analysis of the predicted future failures for predictive reliability mining.

In yet another aspect, there is provided a computer program product for processing data, comprising a non-transitory computer readable medium having program instructions embodied therein for identifying sets of discriminative Diagnostic Trouble Codes (DTCs) from DTCs generated preceding failure, the sets of discriminative DTCs corresponding to associated pre-defined parts of the connected machines; generating a temporal conditional dependence model based on temporal dependence between failure of the pre-defined parts from past failure data and the identified sets of discriminative DTCs; predicting future failures based on the generated temporal conditional dependence and the occurrence and non-occurrence of DTCs; and performing root cause analysis of the predicted future failures for predictive reliability mining.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

Figure 1:
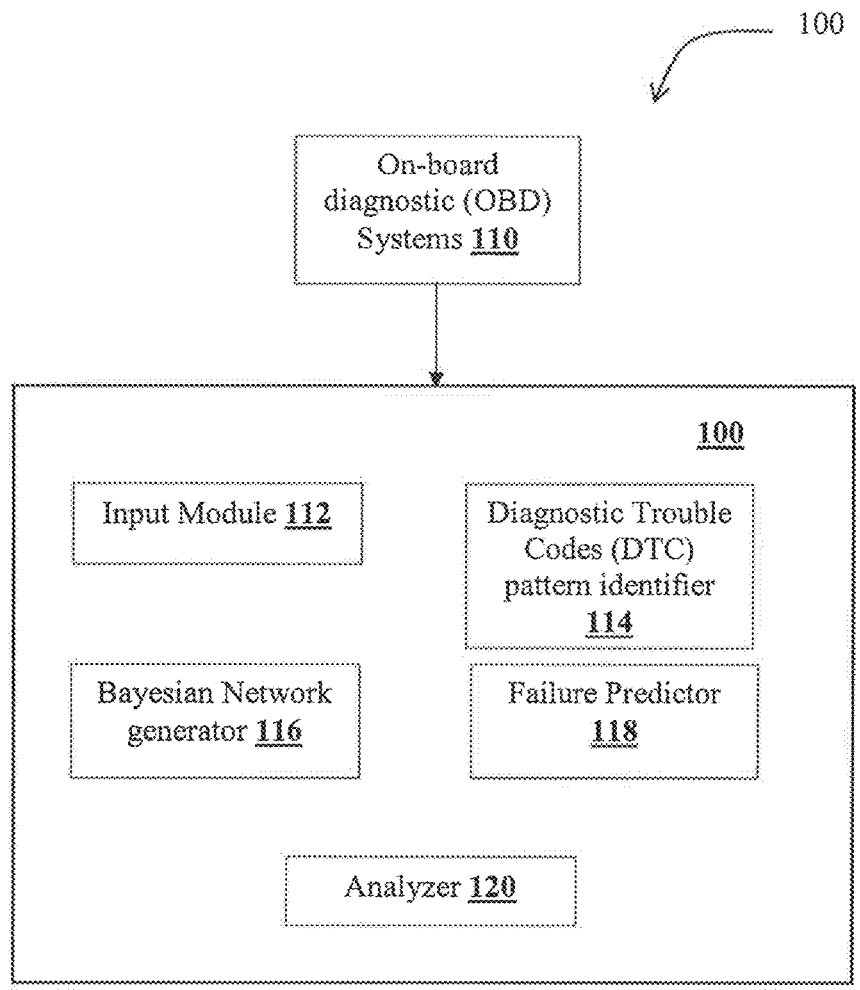
FIG. 1 illustrates an exemplary block diagram of a system for predictive reliability mining in a population of connected machines in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 8, where similar reference characters denote corresponding features consistently throughout the figures, there are shown preferred embodiments and these embodiments are described in the context of the following exemplary system and method.

Figure 2:
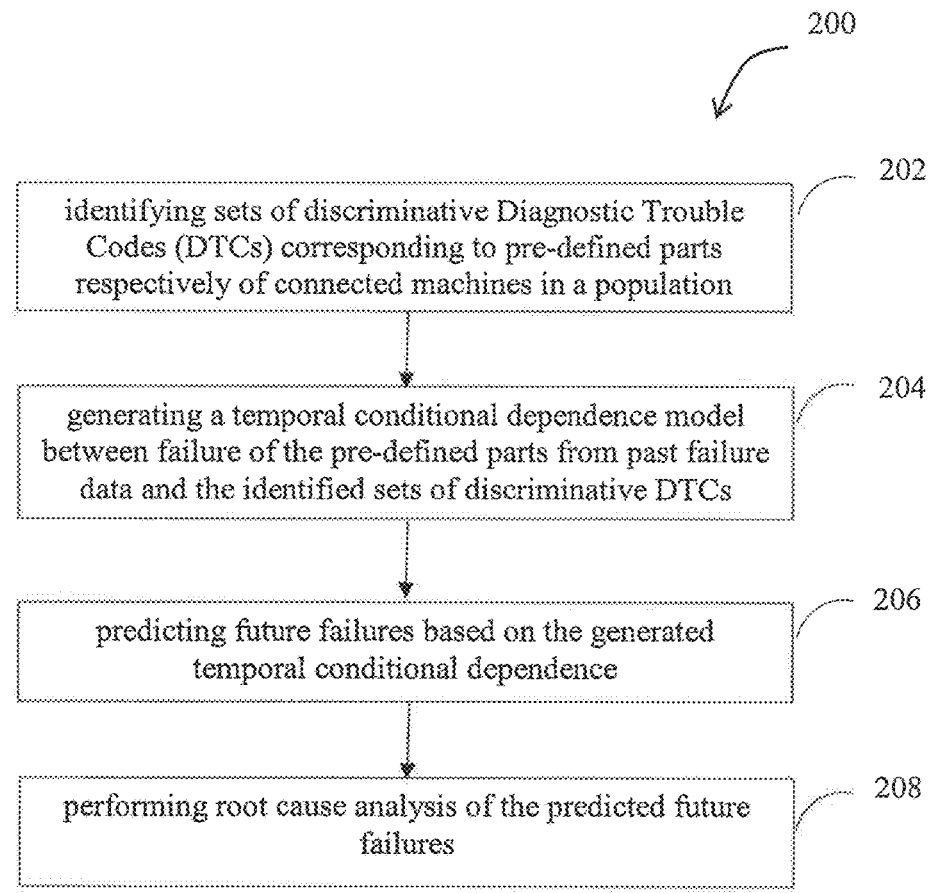
FIG. 2 is an exemplary flow diagram illustrating a computer implemented method for predictive reliability mining in a population of connected machines using the system of FIG. 1 in accordance with an embodiment of the present disclosure.

FIG. 1 illustrates an exemplary block diagram of system 100 for predictive reliability mining in accordance with an embodiment of the present disclosure and FIG. 2 illustrates an exemplary flow diagram illustrating a computer implemented method 200 for predictive reliability model using the system of FIG. 1 in accordance with an embodiment of the present disclosure. The steps of method 200 of the present disclosure will now be explained with reference to the components of system 100 as depicted in FIG. 1. In an embodiment, system 100 includes one or more processors (not shown), communication interface or input/output (I/O) interface (not shown), and memory or one or more internal data storage devices (not shown) operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system 100 can be implemented on a server or in a variety of computing systems, such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules of system 100 can be stored in the memory.

Connected machines are provided with on-board diagnostic (OBD) systems 110. There is typically a many to many mapping between Diagnostic Trouble Codes (DTCs) and parts of the connected machines, i.e., one DTC may indicate a malfunction in more than one part and a malfunction in a single part may trigger more than one DTC. Therefore, it is important to identify discriminative DTCs that can be correlated to future failures of each part, even if they are not uniquely associated with failures of a single part. At step 202, DTC pattern identifier 114 can identify sets of discriminative DTCs wherein the sets of discriminative DTCs correspond to associated pre-defined parts of the connected machines. In an embodiment, the step of identifying sets of discriminative DTCs is based on association rule mining. In an embodiment, the association rule mining can include identifying rules for discriminative DTCs for each part by examining DTC occurrences in situations leading to failures and comparing these with situations where no failures are observed.

In order to use DTCs effectively as an early warning indicator of part failure, at step 204, a temporal conditional dependence model is generated by Bayesian Network generator 116. In an embodiment, the temporal conditional dependence model is based on the temporal dependence between failure of the pre-defined parts from past failure data and the identified sets of discriminative DTCs. Systems and methods of the instant disclosure, thus use past failure data, the identified sets of discriminative DTCs and the temporal dependence therein to augment traditionally known reliability models. In an embodiment, the temporal dependence between failure of the pre-defined parts from past failure data and the identified sets of discriminative DTCs follows a Weibull distribution.

At step 206, future failures are predicted based on the generated temporal conditional dependence by failure predictor 118. In an embodiment, the step of predicting future failures comprises generating early warning when the predicted number of failures are greater than the expected number of failures based on the past failure data by a pre-defined value. In an embodiment, failure predictor 118 is configured to identify parts of the connected machines associated with the early warning and accordingly identify an associated subset of the population.

At step 208, root cause analysis of the predicted future failures for predictive reliability mining is performed by analyzer 120.

Steps 202 through 208 of FIG. 2 will now be explained in further detail. In the context of the present disclosure, various expressions used hereinafter are defined as given below.

Let $I=\{i_1, i_2, \ldots i_m\}$ be a set of m binary attributes called items. Let $D=\{t_1, t_2, \ldots t_n\}$ be a set of transactions called the database. Each transaction in D has a unique id and contains a subset of items in I. Itemsets X, Y are called antecedent and consequent of a rule respectively. An association rule r is an implication expression of the form $X \rightarrow Y$, where $X, Y \subseteq I$ and $X \cap Y = \emptyset$. The support s(X) of an itemset X is defined as the fraction of transactions in the database D which contain the itemset X. The confidence of a rule conf(r) is $s(X \cup Y)/s(X)$. Further lift of a rule l(r) measures its interestingness and it is a ratio of its confidence and support of consequent. i.e. conf(r)/s(Y). The coverage of a rule r is the fraction of number of transaction in D containing X, and is given by s(X). Let $R=\{r1, r2, \ldots r_l\}$ be a set of I rules then coverage of R represented by $c_R$ in D is a fraction of transactions in D containing either of the antecedents of rules in set R.

Step 202 wherein sets of discriminative Diagnostic Trouble Codes (DTCs) are identified involves identifying DTCs which are discriminative for failure of say part Pi, i.e., DTCs which occur before failure of Pi but not before other part failures. In an embodiment, identifying discriminative DTCs is based on association rule mining. In an embodiment, the association rule mining uses Apriori technique to identify rules of DTCs which lead to failure of part Pi with high confidence and lift. Since a single part can fail due to different reasons in different vehicles, it is possible to obtain more than one high confidence rule for a single part. For part $P_i$, let I be the item set of all possible DTCs for the entire population of connected machines. At any given time $t_0$, let $P_i$ represent a failed part as in n connected machines. For each of the n connected machines, starting from the failure date of part $P_i$, all DTCs in transaction $f_i$ which get triggered in past d days are collected and item f representing failure is added to each transaction. Thus, for n connected machines, a set of n transactions $D_f=\{f_1, f_2, \ldots, f_n\}$ called failure set is obtained, where each $f_i \subseteq I$. Similarly, another set $D_{nf}$ called non-failure set for the connected machines is obtained, where parts other than $P_i$ have failed and an item $n_f$ is added to every transaction of the set $D_{nf}$. For multiple occurrence of a single DTC in one transaction, the first occurrence of that DTC is considered. A set of rules $R=D_f \cup D_{nf}$ using Apriori technique are generated. Rules in the set R having confidence con $f(r) > \tau_p \forall r \in R$, and $c_R$ representing the coverage of set R in $D_f > R_c$ are identified. Here, $\tau_p$ is a prior threshold for confidence and $R_c$ is a prior threshold for coverage.

Set of antecedents of all the rules in set R, form the discriminative set of DTCs as $disc_i=\{D_1, D_2, D_3, \ldots D_N\}$ for the part $P_i$, where each set $D_j$ contains at least one DTC and $D_1 \cap D_2 \cap \ldots D_N = \emptyset$.

Figure 3:
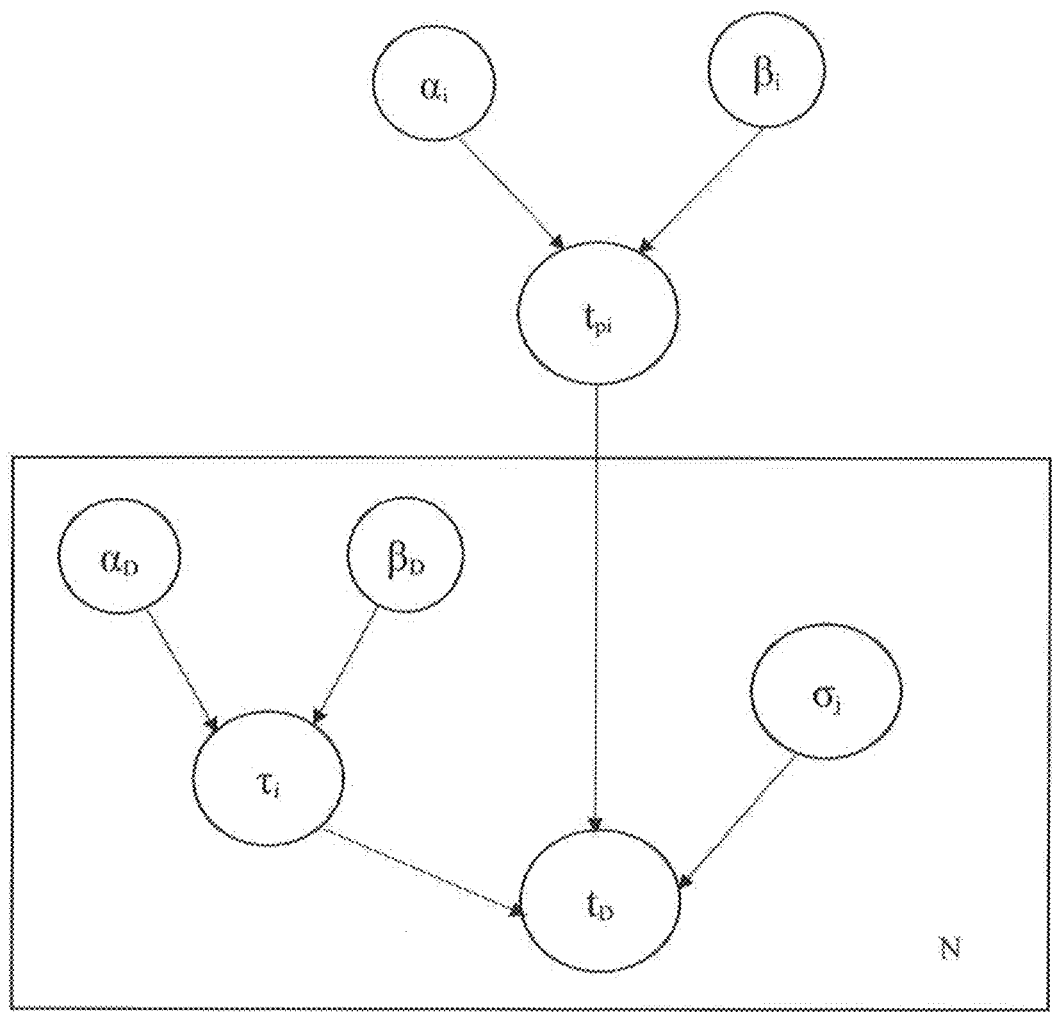
FIG. 3 is a sensor augmented Bayesian reliability model in accordance with an embodiment of the present disclosure.

Since DTCs occur before actual failure, time delay between DTC occurrence and part failure defines the dependency between them. At step 204, a Bayesian reliability model or a Bayesian network is generated based on the dependence between failure of part $P_i$ and its set of discriminative DTCs $disc_i$ as illustrated in FIG. 3. Each node of the Bayesian network represents a continuous random variable as described hereinafter. In the context of the present disclosure, variable $t_{pi}$ refers to time at which part $P_i$ fails. In an embodiment, time $t_{pi}$ follows Weibull distribution with failure parameters $\alpha_i$ and $\beta_i$, representing scale and shape parameters of the Weibull distribution, respectively as represented in equation (1) herein below.

$$P(t_{pi}|\alpha_i,\beta_i) \sim \text{Weibull}(\alpha_i,\beta_i) \qquad (1)$$

In the context of the present disclosure, uniform distribution is assumed as a pre-requisite for $\alpha_i$ and $\beta_i$ with lower limit as 0 and upper limit as a>0 and b>0 respectively, i.e. $P(\alpha_i) \sim U(0, a)$ and $P(\beta_i) \sim U(0, b)$.

Node $\tau_i$ in FIG. 3 represents variable $\tau_{ij}$ that refers to time delay between failure time of part $P_i$ and occurrence time of DTC $D_j$. In an embodiment, time $\tau_{ij}$ follows Weibull distribution with delay parameters $\alpha_{Dj}$ and $\beta_{Dj}$, representing scale and shape parameters of the Weibull distribution, respectively. The delay parameters capture the temporal conditional dependency between part $P_i$ and DTC $D_j$ as represented in equation (2) herein below.

$$P(\tau_{ij}|\alpha_{Dj},\beta_{Dj}) \sim \text{Weibull}(\alpha_{Dj},\beta_{Dj}) \qquad (2)$$

In the context of the present disclosure, uniform distribution is assumed as a pre-requisite for delay parameters with lower limit as 0 and upper limit as $a_{Dj}>0$ and $b_{Dj}>0$ respectively, i.e. $P(\alpha_{Dj}) \sim U(0, a_{Dj})$ and $P(\beta_{Dj}) \sim U(0, b_{Dj})$.

Since DTCs occur before part failure, in the context of the present disclosure, node $t_D$ represents variable $t_{Dj}$ that refers to time at which DTC $D_j$ occurs in terms of variables $t_{pi}$ and $\tau_{ij}$. In an embodiment, time $t_{Dj}$ follows normal distribution with mean as $t_{pi}-\tau_{ij}$ with standard deviation $\sigma_j$ as represented in equation (3) herein below.

$$P(t_{Dj}|\tau_{ij},\sigma_j) \sim N(t_{pi}-\tau_{ij},\sigma_j) \qquad (3)$$

wherein pre-requisite for $\sigma_j$ is uniform distribution i.e. $\sigma_j \sim U(0, s_j)$.

In accordance with the present disclosure, the Bayesian network approximates joint distribution with one node represented by $t_{pi}$, one node for every DTC $D_j$ in discriminative set of $P_i$ represented by $\tau_{ij}$, one for every $D_j \in disc_i$ represented by $t_{Dj}$, and rest of the nodes representing the parameters of these three random variables. All parameters of the model, namely the Weibull parameters for failures and DTCs, and mean and variance of the normally distributed delays, are learned using Markov Chain Monte Carlo (MCMC) sampling given past failure data and DTC data from a population of connected machines.

At step 206, future failures are predicted based on both past failure data and discriminative DTCs that have been modeled as the Bayesian network in step 204. Let $N_{pi}$ represent number of failures of part $P_i$ during a particular time frame in the future based on DTCs and $M_{pi}$ represent expected number of failures in same time frame using the traditional reliability model. Statistically comparing $N_{pi}$ and $M_{pi}$, an early warning is generated by system 100 when $N_p$ is higher than $M_{pi}$ by a pre-determined value.

Given m connected machines and time $t_0$, suppose $P_i$ has failed in n out m connected machines, let V be the set of remaining r (=m−n) connected machines, failure probability that the part $P_i$ will fail in $[t_1, t_2]$ ($t_2 > t_1 > t_0$) given that it has survived till $t_0$ is represented by equation (4) herein below.

$$P(t_{pi} \in [t_1, t_2] | t_{pi} > t_0) = \frac{P(t_{pi} \le d_2) - P(t_{pi} \le d_1)}{P(t_{pi} > t_0)} \qquad (4)$$

$$= \frac{F(d_2) - F(d_1)}{S(t_a)},$$

where $d_k$ is the time calculated till $t_k$ from some initial time and $F(t)$ is the probability that the part will fail before time t.

$F(t)$, as known in the art, can be represented by equation (5) herein below.

$$F(t) = 1 - e^{-(t/\alpha)^\beta} \qquad (5)$$

where $\alpha$ and $\beta$ are scale and shape parameters of Weibull distribution and $S(t)$ is called survival probability which can be represented by equation (6) herein below.

$$S(t) = 1 - F(t) \qquad (6)$$

Failure probability of part $P_i$ for every $v \in V$ is calculated using traditional basic reliability model (BRM) as well as the sensor-augmented reliability model (SARM) that incorporates DTCs. In the conventional BRM, only past failure data of part $P_i$ is utilized to calculate failure probability in r vehicles. Using 'failure parameters' as scale and shape parameters and selling time $t_s^v$ of every vehicle $v \in V$ as initial time, i.e., $d_k^v = t_k - t_s^v$ in equations 4 and 5. Then $p_i^v$, the failure probability for every $v \in V$ is calculated.

In SARM of the present disclosure, both past failure data and DTCs are utilized. Remaining r vehicles in which part $P_i$ has not failed till $t_0$ are divided into two sets 1) $V_1$: set of vehicles in which at least one of $Dj \in disc_i$ has occurred in $[t_0-d, t_0]$, and 2) $V_0$: set of vehicles in which none of $D_j \in disc_i$ has occurred in $[t_0-d, t_0]$.

For vehicles in $V_1$, since at least one of the $D_j \in disc_i$ has occurred in $[t_0-d, t_0]$, for every $v \in V_1$, occurrence time $t_{Dj}$ of DTC $D_j$ is used as the initial time i.e. $d_k^v = t_k - t_{Dj}$. Further using 'delay parameters' as scale and shape parameters in equations 4 and 5, $p_{i1}^v$, the failure probability of part $P_i$ for every $v \in V_1$ is calculated given that the DTC $D_j$ occurred at time $t_{Dj}$. In case more than one discriminative DTC has occurred in a vehicle, a DTC with highest confidence is used. Further, since the confidence conf(r) of rule r: $D_j \rightarrow P_i$ states that $(1-\text{conf}(r))\%$ times DTC $D_j$ will lead to the failure other than $P_i$, $P_{i1}^v$ is marginalized with equation 7 given herein below.

$$p_{i1}^{\prime v} = \text{conf}(r) p_{i1}^v + (1-\text{conf}(r)) p_i^v \qquad (7)$$

wherein, $p_i^v$ is the probability calculated for every $v \in V_1$ as in the case of BRM.

For vehicles in $V_0$, the failure probability of part $P_i$ for every $v \in V_0$ using only past failure data is calculated, i.e. using 'failure parameters' as scale and shape parameters in equations 4 and 5, $p_0^v$ for every $v \in V_0$ is calculated. $t_s^v$, the selling time of a vehicle $v \in V_0$ is used as initial time i.e. $d_k^v = t_k - t_s^v$. Since for every $v \in V_0$, no DTC $Dj \in disc_i$ has occurred in $[t_0-d, t_0]$, but as the definition of $c_R$ states that $c_R\%$ of times, at least one of $Dj \in disc_i$ will occur in $[t_{pi}-d, t_{pi}]$ before the failure of part $P_i$, probability $p_0^v$ using $c_R$ is marginalized with equation 8 given herein below.

$$p_{i0}^{\prime v} = p_{i0}^v (1-c_R)(1-p_{ij}) + p_{i0}^v c_R p_{ij} \qquad (8),$$

wherein $p_{ij}$, the probability that at least one of the DTC $Dj \in disc_i$ will occur in $[t_0, t_1]$. $p_{ij}$ for the part $P_i$ using the n failure of part $P_i$ which occurred till $t_0$ is then learned.

To determine whether the volume of failures as predicted by the BRM model and SARM model of the present disclosure differ significantly enough to declare an early warning, failure of part $P_i$ in a vehicle is considered as a Bernoulli distributed random variable with parameter p (probability of the failure of $P_i$). Since the probability of the failure of $P_i$ is different across vehicles, the failures of $P_i$ in r vehicles forms the r independent and non-identically Bernoulli distributed random variables. Sum of these r variables form another random variable X representing number of failures of $P_i$ in $[t_1, t_2]$ which follows Poisson-Binomial distribution. The mean of X for both the cases is calculated as shown in equation 9 herein below.

$$N_{P_i} = \sum_{v \in V_o} p'^v_{i0} + \sum_{v \in V_1} p'^v_{i1} \quad (9)$$

$$M_{P_i} = \sum_{i=1}^{r} p^v_i \quad (10)$$

Similarly, variance of X for both cases is given as $$\text{Var}_{N_{P_i}} = \sum_{v \in V_0} p'^v_{i0}(1-p'^v_{i0}) + \sum_{v \in V_1} p'^v_{i1}(1-p'^v_{i1}) \quad (11)$$

$$\text{Var}_{M_{P_3}} = \sum_{v \in V} p^v_i(1-p^v_i) \quad (12)$$

In accordance with the present disclosure, early warning for part $P_i$ is reported if $N_{Pi} - M_{Pi} > \tau_{Pi}$, where $\tau_{Pi}$ is decided based on $N_{Pi}$ and $\text{Var}_{NPi}$.

Once an early warning for part Pi is detected, possible root causes are determined in step 208 by identifying and characterizing a subset of the connected machines by rules that point to possible causes for the anomaly. In some cases, a subset which significantly deviated from rest of the population of the connected machines in terms of failure rate, is small as compared to full population, which results into non-early warning case when an analysis is performed at the full population level. System 100 of the present disclosure addresses two possible scenarios—1) Root cause analysis to find a subset of the connected machines, when an early warning for some part is identified at full population level and 2) Rule learning to find a subset of vehicles, when early warning is not visible on the full population level i.e. the difference between $M_{Pi}$ and $N_{Pi}$ is insignificant at the population level, but there is a small unknown subset of population which is significantly deviated from the rest of the population in terms of failure rate.

In accordance with the present disclosure, to find a subset of vehicles which could be possible reason of an already identified early warning, the probabilities computed in equations 7 and 8 herein above are used to determine vehicle-level expected failure times. i.e., $e_i^v$, the expected time of failure of part $P_i$ is computed given that it has survived till time $t_0$ for every $v \in V$, which is given by equation 13 herein below.

$$e_i^v = t'_v + \frac{1}{S(t_v)} \int_{t_v}^{\infty} S(t), \quad (13)$$

wherein $t_v$ and $t_v'$ are time of vehicle till $t_0$ starting from some initial time and S(t) is the survival probability.

Failure probability of part $P_i$ for every $v \in V$ is analyzed using traditional basic reliability model (BRM) as well as the sensor-augmented reliability model (SARM) that incorporates DTCs. In BRM, failure parameters are used as scale and shape parameters in equation 13 to calculate $e_{i_1}^v$ for every $v \in V$. In an embodiment, selling time of vehicle v is used as initial time i.e. $t_v' = t_v = t_0 - t_s^v$.

In SARM, expected time of failure $e_{i_2}^v$ of part $P_i$ is determined by dividing r vehicles into sets $V_0$ and $V_1$. For every $v \in V_0$, expected time of failure is calculated. But for the vehicles in $V_1$, delay parameters are used in equation 13 to calculate expected time of failure of $P_1$. Also, occurrence time $t_{Dj}$ of DTC $D_j$ is used as initial time i.e. $t_v = t_0 - t_{D_j}$ and $t_v' = t_{D_j} - t_s^v$.

Thus for every $v \in V$, there are two expected times of failure $e_{i_1}^v$ and $e_{i_2}^v$ of part $P_i$, calculated using BRM and SARM as described herein above. Further, $e_{i_1}^v$ and $e_{i_2}^v$ are used to define anomaly score of part $P_i$ for $v \in V$, which is given by the following equation.

$$\alpha_i^v = |e_{i_1}^v - e_{i_2}^v| \quad (14)$$

Vehicles from the population that have anomaly score greater than a pre-defined threshold are selected to find a subset of vehicles that could point to possible reasons for the early warning. Using feature-by-feature analysis, a collection of features, for instance, model, year of manufacture, plant of manufacture, geography, supplier etc. of the connected machines that differ statistically between the two sets, i.e., the entire population and the subset exhibiting high anomaly scores are determined.

It is also possible that only a small and unknown subset of vehicles deviates significantly from rest of the population in terms of failure rate and the count difference between $N_{Pi}$ and $M_{Pi}$ remains insignificant on the population level. To ensure that such situations are detected, a subgroup of the population exhibiting a high anomaly score is to be identified. In accordance with an embodiment, a subgroup discovery technique is utilized, wherein association rules are clustered to obtain a small set of rules that nevertheless cover a large fraction of the data. As described above, each connected machine or a part thereof can be ascribed an anomaly score, and in accordance with the present disclosure, subgroups of vehicles with high anomaly scores, which are characterized by rules based on machine/part attributes or features, such as model, year of manufacture, plant of manufacture, geography, supplier etc. are to be identified. Each connected machine can be viewed as a record with its features as fields and an anomaly score for part $P_i$ that is discretized into two levels, either 'high' or 'normal', i.e., the anomaly field divides the set of vehicles V into two sets called $E_i$ representing an early warning set and $NE_i$ representing a non early warning set for part $P_i$, wherein $$E_i = \{v \in V : \alpha_i^v > \tau_a\} \quad (15)$$

and $NE_i = E_i^c$ i.e. compliment set of $E_i$.

In accordance with an embodiment, association rules with 'high' anomaly score $E_i$ are first mined as the consequent, e.g. X & Y ... →$E_i$, which also satisfy a reasonable minimum confidence (e.g. conf(r)>0.75). These rules are then sorted in decreasing order of support, to choose a leading subset that covers a large enough fraction of the data (e.g. at least 50%). Next the rules are clustered using a density-based technique such as DBS can and a distance measure that is inversely proportional to the degree of overlap between two rules, i.e., the number of records that satisfy both rules. As a result, each rule duster contains rules that strongly overlap with each other; conversely rules from different clusters have low mutual overlap. Finally, one or more rules are selected from each cluster that have high support and confidence, arriving at a small set of rules that each identify a subset of connected machines with predominantly high anomaly scores; the antecedents of such rules point to potential causes for the high anomaly scores observed. Further, each rule can be refined with its 'exceptions' by re-running the above procedure on only the data covered by the antecedents of the rule, but this time using $NE_i$ as the consequent. The rule-learning procedure, as described herein above, has to be executed regardless of whether an anomaly is detected at the level of the entire population or not, since it is designed especially for the situation where an anomaly is not visible at the population level.

Experimental Results

Systems and methods of the present disclosure were validated by predicting future failures on real-life dataset of an automobile manufacturer and by comparing it against actual failures and expected failures calculated using BRM. Three scenarios encountered in real-world data were considered viz., 1) when actual failure volumes are significantly higher than expected, i.e., a case of early warning 2) when actual failure volumes are lower than expected 3) when actual and expected failures volumes match. The 'expected' failure volumes referred to herein are those predicted by a traditional basic reliability model (BRM) based on past failure data alone. In each of the above cases, it was seen that the augmented model (SARM) of the present disclosure predicts future volumes that are closer to actual numbers than the traditional model (BRM). The SARM model of the present disclosure was also validated for root cause analysis and rule learning on synthetic data.

Real-Life Data:

Three datasets including sales data, DTC data and claims data were considered. Table I shows number of unique vehicles or vehicle identification numbers VINs and time period for which all three datasets are available.

TABLE I

Data profiling of whole data

| Whole data | Sales data | DTC data | Claims data |
|---|---|---|---|
| Number of unique VINs | 1.9M | 54K | 0.5M |
| Time period | 3 years | 2 years | 2 years |

Based on the availability of data, two parts $P_G$ and $P_B$ are chosen to validate methods and systems of the present disclosure and results were computed for the three scenarios mentioned herein above. Data profiling for these two parts is given in Table II.

TABLE II

Data profiling of parts $P_G$ and $P_B$

| Part chosen | $P_G$ | $P_B$ |
|---|---|---|
| Unique VINs in claim data | 513 | 7651 |
| Unique VINs in DTC data | 445 | 1239 |
| Claim data period | 1.8 years | 2 years |
| DTC data period | 6 months | 9 months |

In accordance with the methods of the present disclosure, firstly a discriminative set of DTCs for each part is identified. Table III shows the rules identified for parts $P_G$ and $P_B$.

TABLE III

Rules of DTCs identified for the parts $P_G$ and $P_B$

| Part | Rule No. | Antecedent | Consequent | Support in D | Support in F | Confidence | Coverage |
|---|---|---|---|---|---|---|---|
| $P_G$ | 1 | P2162 | $P_G$ | 0.168 | 0.485 | 0.90 | 83% |
| | 2 | P07E7 | $P_G$ | 0.15 | 0.43 | 0.73 | |
| | 3 | P07E0 | $P_G$ | 0.17 | 0.42 | 0.87 | |
| $P_B$ | 1 | B1304 | $P_B$ | 0.18 | 0.58 | 0.93 | 84% |
| | 2 | B100D | PB | 0.17 | 0.55 | 0.83 | |
| | 3 | B1D21 | PB | 0.15 | 0.48 | 0.87 | |

It shows that there are three rules with $\tau p=0.7$ and $R_c=0.8$ for both the parts. It also shows the support of each rule in whole database D and in a failure set $D_f$. So, the $disc_i$ for the part $P_G$ is {P2162, P07E7, P07E0} and for the part $P_B$ is {B1304, B100D, B1D21}. For each part, the delay and failure parameters of every DTC in $disc_i$ is learnt using a Bayesian graphical model as explained herein above with reference to step 204 of the method of the present disclosure. For the experiment, python library 'pymc' was used to estimate the parameters of Bayesian model via Markov Chain Monte Carlo (MCMC) sampling.

Figure 4:
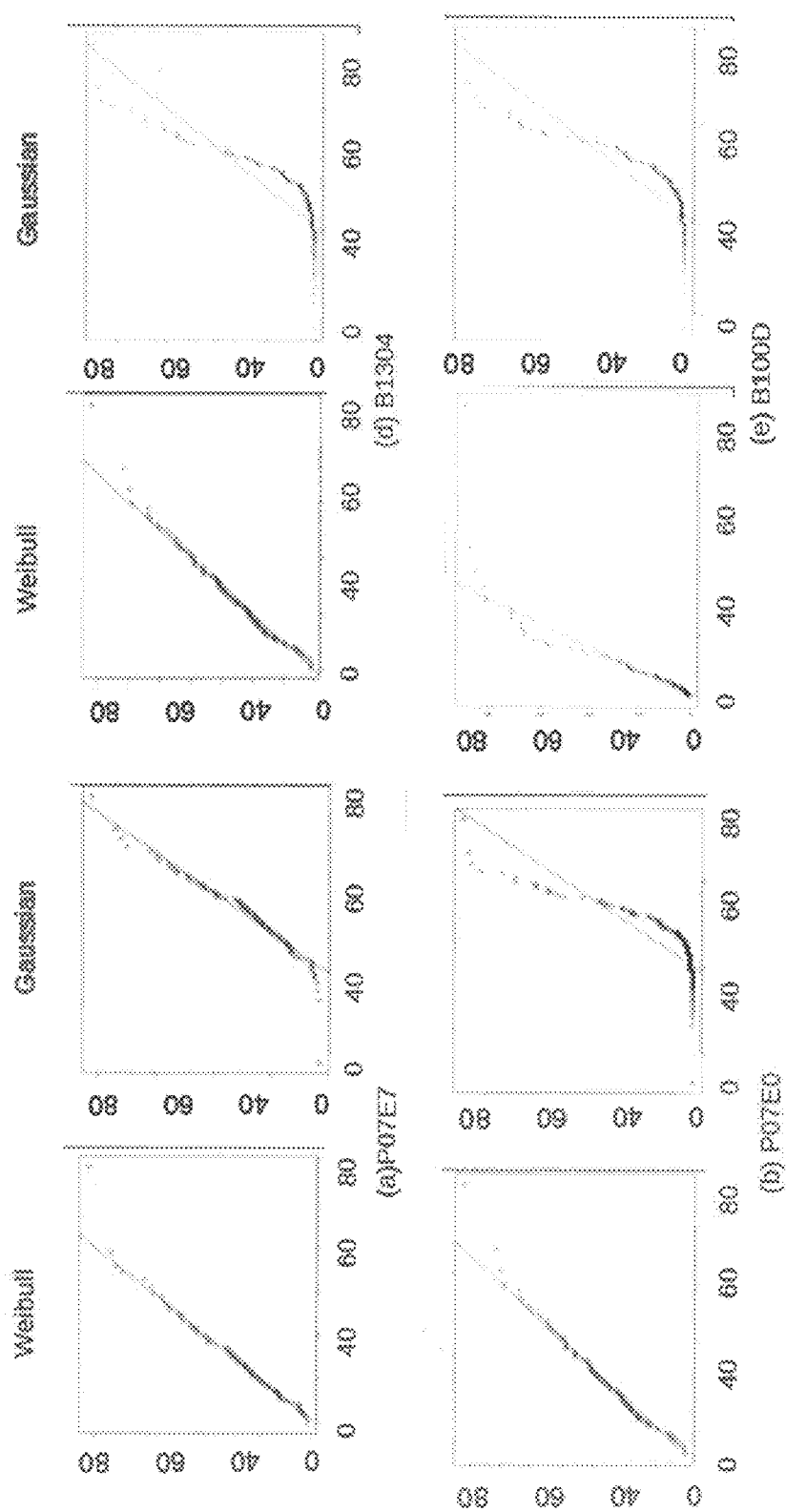
FIG. 4 illustrates QQ (Quantile) plots of DTCs sampled from Weibull and Gaussian distribution of an exemplary set of data.

As described herein above in the Bayesian model, it is assumed that the delay between part failure and DTC occurrence follows Weibull distribution with delay parameters as scale and shape parameters of the distribution. It was empirically confirmed that the Weibull distribution is good fit for the variable $\tau_{ij}$. The goodness of fit of Weibull distribution was compared with Gaussian distribution for the variable $\tau_{ij}$. FIG. 4 illustrates QQ (Quantile) plots between the actual data of variable $\tau_{ij}$ and data sampled from Weibull and Gaussian distributions, with parameters estimated from Bayesian model, for all the six DTCs. It clearly shows that the Weibull distribution is better fit than a Gaussian distribution for the variable $\tau_{ij}$. Apart from the QQ plots, Kolmogorov-Smirnov(K-S) test was used to check goodness of fit for the variable $\tau_{ij}$. Table IV shows the p-value of Weibull and Gaussian distribution for the variable $\tau_{ij}$. It also shows the values of delay and failure parameters in terms of days calculated from selling time of vehicle, which was learned for parts and their discriminative DTCs using Bayesian model.

TABLE IV

Parameters learned using Bayesian Graphical Model

| Part | DTC | $\alpha_{Dj}$ | $\beta_{Dj}$ | $\alpha_i$ | $\beta_i$ | p-value using Weibull | p-value using Gaussian |
|---|---|---|---|---|---|---|---|
| $P_G$ | P2162 | 9.572 | 0.81 | 3603.53 | 3.58 | 0.44 | 0.31 |
| | P07E7 | 32.637 | 1.65 | 3603.53 | 3.58 | 0.39 | 0.21 |
| | P07E0 | 29.723 | 1.71 | 3603.53 | 3.58 | 0.31 | 0.19 |
| $P_B$ | B1304 | 12.04 | 0.52 | 900.45 | 2.24 | 0.37 | 0.12 |
| | B100D | 28.97 | 1.32 | 900.58 | 2.24 | 0.34 | 0.14 |
| | B1D21 | 34.23 | 1.45 | 900.58 | 2.24 | 6.31 | 0.12 |

Figure 5:
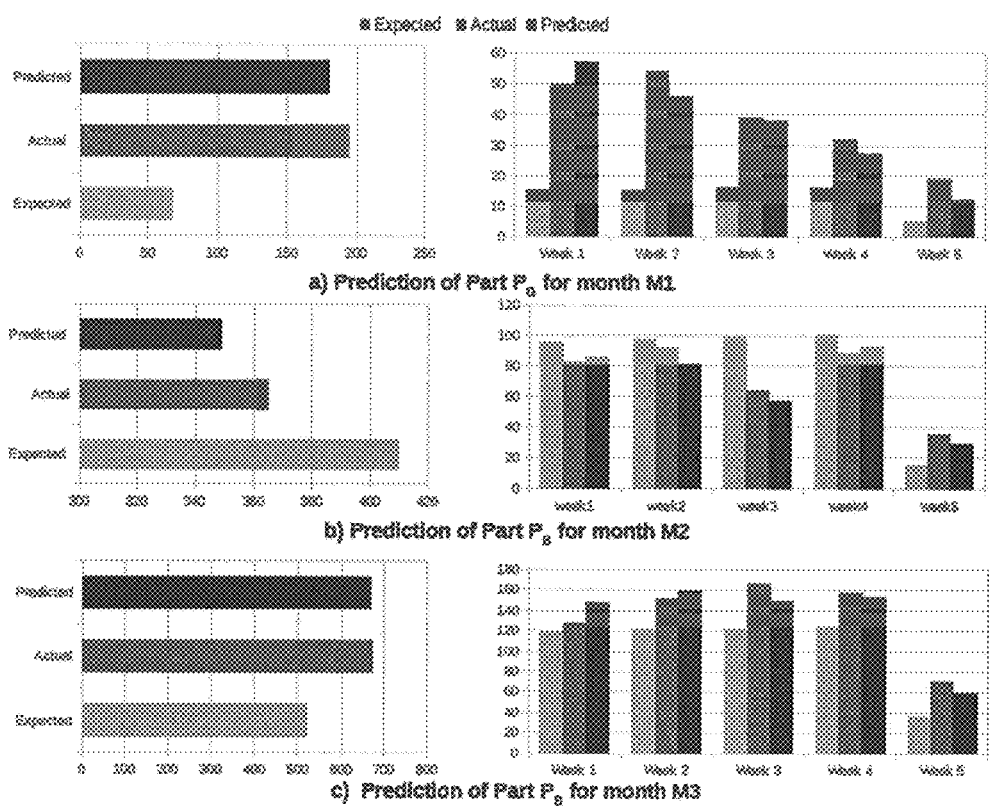
FIG. 5 illustrates comparison of number of failures predicted by SARM versus actual versus expected by BRM.

In accordance with the present disclosure, future number of failures of parts $P_G$ and $P_B$ are then predicted using delay and failure parameters shown in Table IV. For part $P_G$, claim data and DTC data till $t_0$ are used to identify discriminative set of DTCs and for learning Bayesian model parameters. The number of failures for the month of M1 ($>t_0$) is predicted and compared against expected number of failures and actual failures. Similarly for part $P_B$, the number of failures for two months M2 and M3 are predicted. FIG. 5 shows the failure numbers predicted (using SARM) vs actual vs expected (by BRM) for the three scenarios mentioned above, clearly demonstrating the better predictive performance of SARM of the present disclosure compared to expected failures using BRM. It is noted that the predictions point to an early warning for part $P_G$, since the difference between predicted (SARM) and expected (BRM) values is significant. Moreover, the SARM predictions eventually match better with the observed failures in M1.

Figure 6:
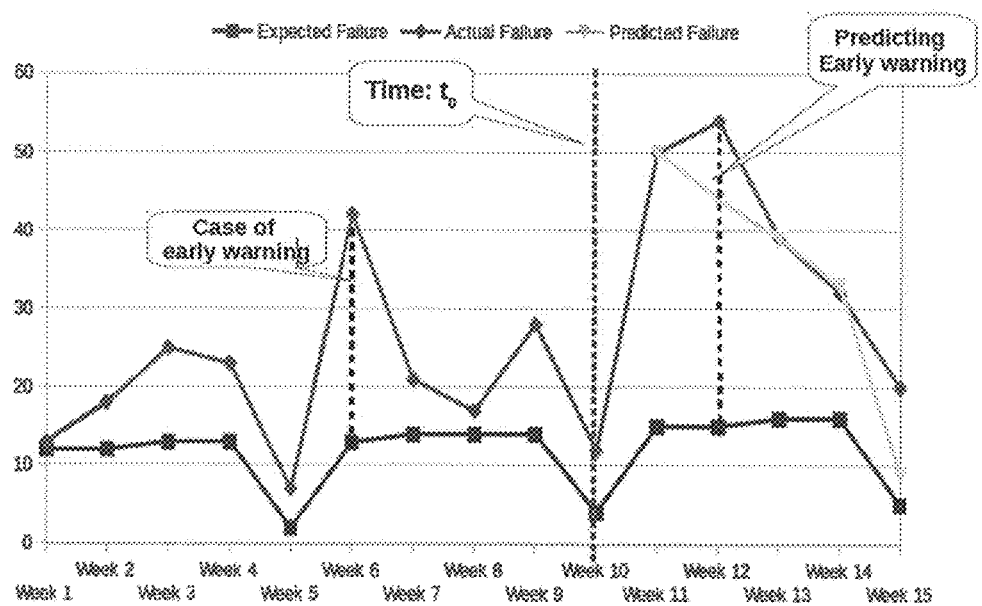
FIG. 6 illustrates weekly trend of failures and predictions for part $P_G$.

FIG. 6 shows a weekly trend of expected vs actual vs predicted, for part $P_G$. It can be clearly seen that there is a case of early warning in week 6 and similar early warning trend is occurring in future weeks ($>t_0$), and the SARM model of the present disclosure accurately predicts this trend.

Synthetic Data:

Three scenarios 1) NW: non early warning, 2) EW-1: early warning-1, and 3) EW-2: early warning-2 were simulated. For NW, 0.1M records were generated for vehicles with purchase date, miles driven, DTC occurrence dates, and part failure dates; assuming purchase dates to be uniformly distributed over a period of 5 years. The number of miles driven per day for each vehicle was drawn from a uniform distribution. Failure times were generated for 10 parts using Weibull distributions with different scale and shape parameters. DTC data with DTC codes were also generated, which become observable prior to the part failure. Delay between part failure and DTC occurrence was generated using Weibull distribution with different parameters for each DTCs. Attributes or features of the vehicles generated are shown in Table V.

TABLE V

Attributes or features of vehicles in synthetic data

| Attribute | Range |
| --- | --- |
| Model Year | 2010 to 2014 |
| Manufacturing Plant | 1, 2, 3 |
| Geography | United States, China, United Kingdom, India |
| Doors | 4 and 5 |

In case of EW-1, early warning in vehicles of model year 2012 was induced by preponing the failure times of part $P_i$ in these vehicles. Similarly, in case of EW-2, early warning in vehicles of model year '2012', of geography 'US', and manufactured from plant 1 and 2 was induced by preponing the failure times of part $P_i$ in these vehicles. Given the time $t_0$, failures of part $P_i$ using early warning approach was predicted and compared against expected failures and actual failures.

Table VI contains the average anomaly scores for vehicles across the whole population for each of the above three cases.

TABLE VI

Attributes or features of vehicies in simulated data

| | NW | EW-1 | EW-2 |
| --- | --- | --- | --- |
| Anomaly Score | 6.573 | 11.573 | 7.754 |

It is seen that the anomaly score for EW-1 is almost twice the score of the no warning case (NW), and is therefore visible at the full population level. However, the EW-2 warning is not visible in the full population, with its anomaly score equivalent to that of the NW or no early-warning case.

Figure 7:
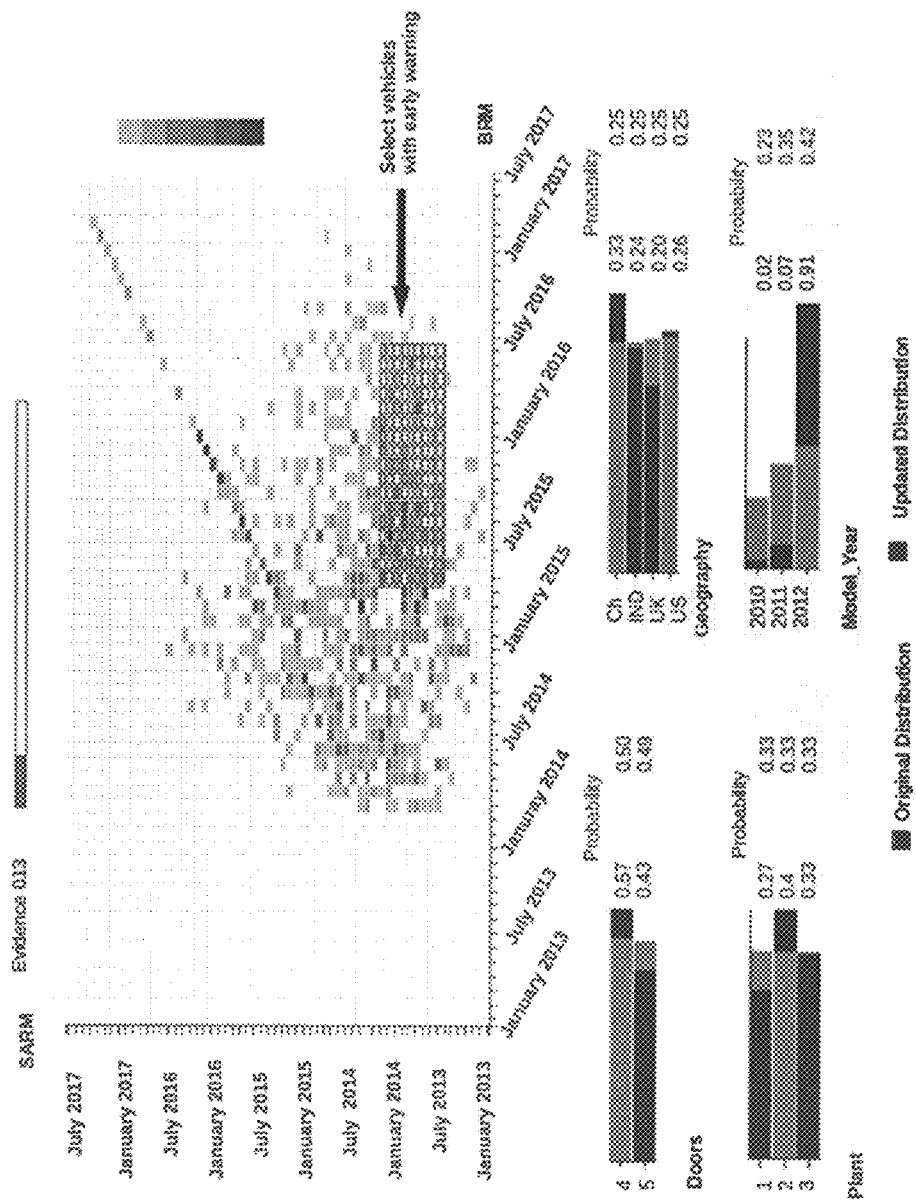
FIG. 7 illustrates root cause analysis of early warning (EW-1) using visual analytics.

Root cause analysis was performed to reveal the potential cause for EW-1. EW-2 can be detected only by rule learning since it is invisible from average anomaly scores at a whole population level. Root cause analysis for the part $P_i$ is demonstrated through a visual analytics workbench illustrated in FIG. 7, which shows a heat-map between expected month of failures of part $P_i$ across vehicles, calculated using BRM (x-axis) and SARM (y-axis). It also shows the distribution of various attributes of vehicles selected for viewing. The area well below the diagonal of the heat-map contains vehicles where SARM predicts a far earlier failure than BRM, i.e., the vehicles involved in the early-warning. Selecting a range from this region updates the attribute-wise distributions to those for this restricted set. Using the distributions before and after such a selection are compared, thus revealing the reason for the early warning. FIG. 7 clearly suggests that after selecting vehicles in the lower right region, i.e., those with high anomaly scores, the probability of the attribute 'Model year-2012' increases significantly, which shows that high percentage of vehicles that lie in high anomaly score region comes from 2012 model year cars.

Figure 8:
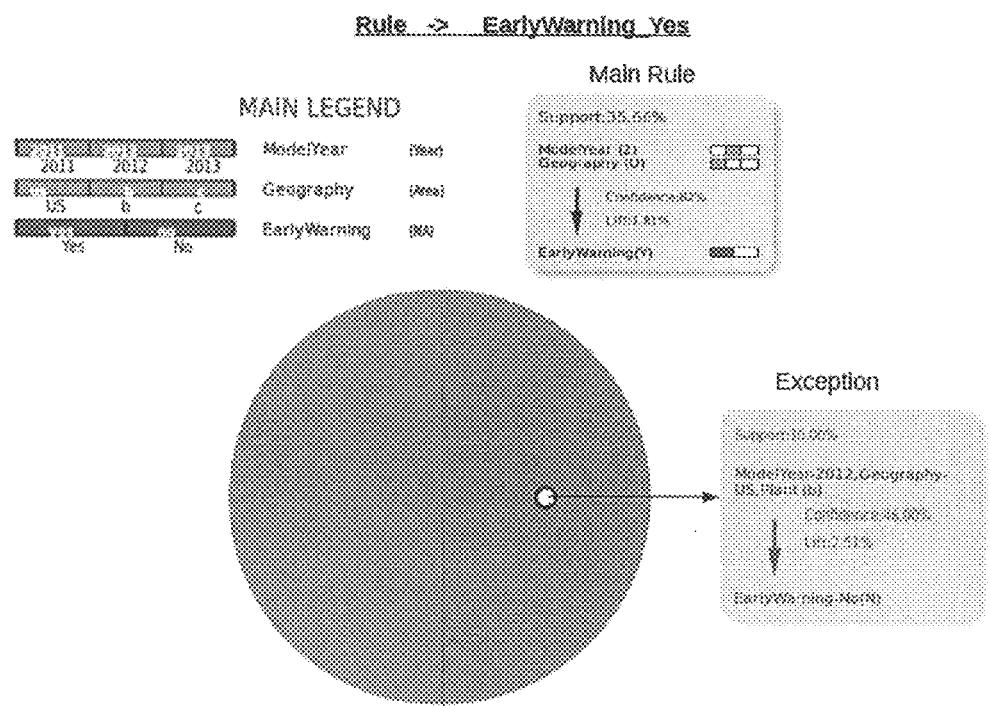
FIG. 8 illustrates subgroup discovered for early warning (EW-2) as a rule exception pair.

For rule learning of the part $P_i$ in case of EW-2, vehicles in which part Pi has not failed till $t_0$ are divided into two sets: 'early warning' and 'non-early warning', using a threshold $\tau_a$ as the average of the anomaly score of all vehicles. Further, rules and exceptions of the attributes of vehicles are identified using techniques, as explained with reference to equations 13, 14 and 15. FIG. 8 illustrates an exemplary rule-exception pair discovered for an early warning set, wherein the confidence, support and lift for a rule are shown; additionally one exception to the rule is shown in a similar fashion. This shows that vehicles of model year 2012 and of geography 'US' and manufactured from all plants are showing an early warning, with confidence of 82% and support of 15.6%, albeit with one exception: within the cars covered by this rule, those manufactured from plant b more predominantly lie in the non-early warning set than others.

Systems and methods of the present disclosure provide a complete framework to predict early warnings of unexpected failure volumes using sensor-based DTCs together with part failure data and combine early warnings of failure surges with root cause analysis as well as subgroup discovery. Systems and methods of the present disclosure exploit the availability of indicator sensors embedded in modern vehicles to signal such early warnings, by comparing traditional reliability predictions with those from a model augmented with sensor information as collected and transmitted over the 'industrial internet' of highly connected populations of machines. When the two models differ significantly it is indicative of a population level anomaly, and perhaps an indicator of the possible need for, say, a recall in the future. In addition to detecting anomalies in the above manner, systems and methods of the present disclosure enable drilling down to discover potential root causes of the anomaly, so that it can be addressed in advance. Finally, systems and methods of the present disclosure identify anomalies in small subgroups that are not statistically visible in the overall population. The efficacy of the systems and methods of the present disclosure are apparent from the experiments performed using real-life data wherein actual early warnings have been detected and experiments using synthetically generated data wherein root cause analysis and rule discovery was accurately established.

Although systems and methods of the present disclosure have been illustrated with reference to failure prediction in the automobile industry via experimental data herein above, it may be understood by persons skilled in the art that failure prediction plays important role in many domains and systems and methods of the present disclosure may be applied to software, health and insurance domain, and the like.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context dearly dictates otherwise.

It is intended that the disclosure and examples be considered as exemplary only, with a true scope and spirit of disclosed embodiments being indicated by the following claims.

What is claimed is:

1. A computer implemented method for predictive reliability mining in a population of connected machines, the method comprising:
   identifying sets of discriminative Diagnostic Trouble Codes (DTCs) from DTCs generated preceding failure, the sets of discriminative DTCs corresponding to associated pre-defined parts of the connected machines;
   generating a temporal conditional dependence model based on temporal dependence between failure of the pre-defined parts from past failure data and the identified sets of discriminative DTCs;
   segregating the population of connected machines into a first set comprising connected machines in which DTCs are not generated in a given time period and a second set comprising connected machines in which at least one DTC is generated in the given time period; and
   predicting future failures based on the generated temporal conditional dependence model and occurrence and non-occurrence of DTCs in the segregated population of connected machines.

2. The computer implemented method of claim 1 further comprising a step of performing root cause analysis of the predicted future failures for predictive reliability mining.

3. The computer implemented method of claim 2, wherein the step of performing root cause analysis comprises identifying a subset of the population when an early warning for at least one of the pre-defined parts is generated.

4. The computer implemented method of claim 2, wherein the step of performing root cause analysis comprises identifying a subset of the population with a possible anomaly when an early warning is not generated at the population level.

5. The computer implemented method of claim 4, wherein the step of performing root cause analysis comprises identifying a subset of the population with a possible anomaly when an early warning is not generated at the population level comprises:
(i) defining an anomaly score for each of the connected machines;
(ii) associating each of the connected machines with a record comprising a set of pre-defined features and the defined anomaly score;
(iii) discretizing the defined anomaly score into either a pre-defined high level or a normal level;
(iv) performing association rule mining to identify association rules with the high level anomaly score;
(v) clustering the identified association rules using a density based technique to form rule clusters;
(vi) selecting one or more rules from each of the rule clusters that have high support and confidence; and
(vii) identifying the subset of the population with the high level anomaly score based on antecedents of the selected one or more rules that are indicative of potential reasons for the high level anomaly score.

6. The computer implemented method of claim 1, wherein the step of identifying sets of discriminative DTCs is based on association rule mining.

7. The computer implemented method of claim 6, wherein the association rule mining comprises use of Apriori technique.

8. The computer implemented method of claim 6, wherein antecedents of rules identified by the association rule mining technique form the set of discriminative DTCs.

9. The computer implemented method of claim 1, wherein the temporal conditional dependence model is a Bayesian network.

10. The computer implemented method of claim 1, wherein the temporal dependence between failure of the pre-defined parts from past failure data and the identified sets of discriminative DTCs follows a Weibull distribution.

11. The computer implemented method of claim 1, wherein the step of predicting future failures comprises the step of computing the probability of failure based on both occurrence and non-occurrence of DTCs in the segregated population of connected machines and generating an early warning when predicted number of failures are greater than expected number of failures based on the past failure data by a pre-defined value.

12. The computer implemented method of claim 11, wherein the pre-defined value is based on the predicted number of failures and variance of a random variable representing number of failures of the pre-defined parts in a given time period.

13. The computer implemented method of claim 1, wherein the step of performing root cause analysis when an early warning for at least one of the pre-defined parts is generated comprises:
(i) calculating a first expected time of failure based on the past failure data;
(ii) calculating a second expected time of failure based on expected time of failure of the second set of the segregated population that is further based on pre-defined delay parameters and occurrence time of the at least one DTC;
(iii) defining an anomaly score for each of the connected machines based on the calculated first expected time of failure and the second expected time of failure;
(iv) iteratively performing steps (i) through (iv) for pre-defined features of the connected machines; and
(v) identifying the subset of the population having the anomaly score greater than a pre-defined threshold, the identified subset indicating possible reasons for the early warning for each of the pre-defined features.

14. A system for predictive reliability mining in a population of connected machines, the system comprising:
one or more hardware processors;
a communication interface device;
one or more internal data storage devices operatively coupled to the one or more processors for storing;
an input module configured to receive Diagnostic Trouble Codes (DTCs) from on-board diagnostic systems of pre-defined parts of the connected machines;
a DTC pattern identifier configured to identify sets of discriminative DTCs from the DTCs generated preceding failure, the sets of discriminative DTCs corresponding to associated pre-defined parts of the connected machines;
a Bayesian network generator configured to:
generate a temporal conditional dependence model based on temporal dependence between failure of the pre-defined parts from past failure data and the identified sets of discriminative DTCs; and
segregate the population of connected machines into a first set comprising connected machines in which DTCs are not generated in a given time period and a second set comprising connected machines in which at least one DTC is generated in the given time period; and
a failure predictor configured to predict future failures based on the generated temporal conditional dependence and occurrence and non-occurrence of DTCs in the segregated population of connected machines.

15. The system for predictive reliability mining of claim 14 further comprising an analyzer configured to perform root cause analysis of the predicted future failures for predictive reliability mining.

16. A computer program product comprising a non-transitory computer readable medium having a computer readable program embodied therein, wherein the computer readable program, when executed on a computing device, causes the computing device to:
identify sets of discriminative Diagnostic Trouble Codes (DTCs) from DTCs generated preceding failure, the sets of discriminative DTCs corresponding to associated pre-defined parts of the connected machines;
generate a temporal conditional dependence model based on temporal dependence between failure of the pre-defined parts from past failure data and the identified sets of discriminative DTCs;
segregate the population of connected machines into a first set comprising connected machines in which DTCs are not generated in a given time period and a second set comprising connected machines in which at least one DTC is generated in the given time period; and
predict future failures based on the generated temporal conditional dependence model and occurrence and non-occurrence of DTCs in the segregated population of connected machines.

* * * * *